(12) United States Patent
Wakita

(10) Patent No.: US 10,917,441 B2
(45) Date of Patent: Feb. 9, 2021

(54) COMMUNICATIONS SYSTEM THAT DETECTS AN OCCURRENCE OF AN ABNORMAL STATE OF A NETWORK

(71) Applicant: HONDA MOTOR CO., LTD., Tokyo (JP)

(72) Inventor: Kazuyoshi Wakita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 57 days.

(21) Appl. No.: 16/077,743

(22) PCT Filed: Mar. 6, 2017

(86) PCT No.: PCT/JP2017/008751
§ 371 (c)(1),
(2) Date: Aug. 14, 2018

(87) PCT Pub. No.: WO2017/154828
PCT Pub. Date: Sep. 14, 2017

(65) Prior Publication Data
US 2019/0052677 A1    Feb. 14, 2019

(30) Foreign Application Priority Data
Mar. 10, 2016    (JP) .................................. 2016-047341

(51) Int. Cl.
*H04L 29/06*    (2006.01)
*H04L 12/40*    (2006.01)
(Continued)

(52) U.S. Cl.
CPC ............ *H04L 63/302* (2013.01); *H04L 12/28* (2013.01); *H04L 12/40* (2013.01); *H04L 63/308* (2013.01);
(Continued)

(58) Field of Classification Search
CPC ....... G06F 13/00; G06F 21/552; G06Q 10/10; H04L 12/28; H04L 12/40; H04L 12/46;
(Continued)

(56) References Cited

U.S. PATENT DOCUMENTS

2006/0002238 A1* 1/2006 Morris ................. G04G 9/0076
368/47
2007/0099668 A1* 5/2007 Sadri ..................... H04W 16/28
455/562.1
(Continued)

FOREIGN PATENT DOCUMENTS

| CN | 104272663 | 1/2015 |
| JP | 2014-146222 | 8/2014 |

(Continued)

OTHER PUBLICATIONS

International Search Report and Written Opinion for International Patent Application No. PCT/JP2017/008751 dated May 23, 2017, 7 pages.
(Continued)

*Primary Examiner* — Robert B Harrell
(74) *Attorney, Agent, or Firm* — Amin, Turocy & Watson, LLP

(57) ABSTRACT

A communications system includes a transmission device configured to transmit information as a communication message to a network at a predetermined frequency according to a type of information and a reception device configured to receive the transmitted communication message, wherein a first type of information to be transmitted at a first frequency and a second type of information to be transmitted at a second frequency higher than the first frequency are transmitted as different communication messages to the network, and wherein the reception device detects the occurrence of an abnormal state in the network on the basis of the number of receptions of the second type of information until
(Continued)

the next first type of information is received after the first type of information is received.

7 Claims, 7 Drawing Sheets

(51) Int. Cl.
  *H04L 12/28* (2006.01)
  *H04W 12/12* (2009.01)
  *H04W 72/04* (2009.01)
(52) U.S. Cl.
  CPC ....... *H04W 12/12* (2013.01); *H04W 72/0453* (2013.01); *H04L 2012/40215* (2013.01)
(58) Field of Classification Search
  CPC ... H04L 12/66; H04L 12/581; H04L 12/4625; H04L 29/06; H04L 29/06027; H04L 29/08072; H04L 63/302; H04L 63/308; H04L 63/1408; H04L 63/1416; H04L 63/1441; H04L 63/1458; H04L 63/1466; H04L 2012/40215; H04L 2012/40273; H04L 67/00; H04W 12/12; H04W 72/04; H04W 72/0453
  USPC ............................................ 709/204; 726/23
  See application file for complete search history.

(56) References Cited

U.S. PATENT DOCUMENTS

| | | | | |
|---|---|---|---|---|
| 2010/0218224 | A1* | 8/2010 | Gat | H01Q 1/3275 725/72 |
| 2010/0220652 | A1* | 9/2010 | Ishii | H04L 5/0007 370/328 |
| 2013/0121210 | A1* | 5/2013 | Jain | G06F 21/606 370/255 |
| 2014/0298112 | A1* | 10/2014 | Otsuka | G06F 11/3452 714/47.3 |
| 2015/0163121 | A1* | 6/2015 | Mahaffey | G06F 11/0709 707/687 |
| 2015/0244480 | A1* | 8/2015 | Bly, Jr. | H04W 4/90 455/521 |
| 2015/0358351 | A1 | 12/2015 | Otsuka et al. | |
| 2016/0036837 | A1* | 2/2016 | Jain | H04L 63/1416 726/23 |
| 2016/0344766 | A1* | 11/2016 | Lawlis | B60R 16/023 |

FOREIGN PATENT DOCUMENTS

| | | |
|---|---|---|
| JP | 2014-146868 | 8/2014 |
| JP | 2014-187445 | 10/2014 |

OTHER PUBLICATIONS

Chinese Office Action for Chinese Patent Application No. 201780010453.4 dated May 22, 2020.

\* cited by examiner

COMMUNICATIONS SYSTEM THAT DETECTS AN OCCURRENCE OF AN ABNORMAL STATE OF A NETWORK

Priority is claimed on Japanese Patent Application No. 2016-047341, filed Mar. 10, 2016, the content of which is incorporated herein by reference.

TECHNICAL FIELD

The present invention relates to a communications system.

BACKGROUND ART

In recent years, communications systems in which two or more control devices provided within a vehicle communicate with each other via a network in the vehicle have been proposed. As technology related to such communications systems, technology for detecting an abnormality occurring in a communication state is known (see, for example, Patent Literature 1). According to Patent Literature 1, it is determined whether or not a reception interval of a communication message to be monitored is an appropriate reception interval on the basis of time measurement information. More specifically, a device described in Patent Literature 1 determines the occurrence of an abnormality in the communication state on the basis of a result of measuring the reception interval of the communication message.

CITATION LIST

Patent Literature

[Patent Literature 1]
Japanese Unexamined Patent Application, First Publication No. 2014-187445

SUMMARY OF INVENTION

Technical Problem

Meanwhile, when a communication message is transmitted through a packet, variation in an operation clock of each control device, a delay of a transmission process itself, or fluctuation of a communication frame due to arbitration of a communication message on a communication network may be caused for a time until the communication message is actually transmitted to a network after a process of transmitting the communication message is activated. Even if the transmission process is performed to transmit the communication message at equal intervals, the above-described fluctuation is caused and therefore an interval at which the communication message arrives is not necessarily equal to a theoretical value. Accordingly, the technology described in Patent Literature 1 is insufficient.

An aspect of the present invention has been made in consideration of such circumstances and an objective of the aspect of the present invention is to provide a communications system of more accurately detecting an abnormality in a communication state.

Solution to Problem (1) According to an aspect of the present invention, a communications system is provided that includes a transmission device configured to transmit information as a communication message to a network at a predetermined frequency according to a type of information and a reception device configured to receive the transmitted communication message, wherein a first type of information to be transmitted at a first frequency and a second type of information to be transmitted at a second frequency higher than the first frequency are transmitted as different communication messages to the network, and wherein the reception device detects the occurrence of an abnormal state in the network on the basis of a number of receptions of the second type of information until a next first type of information is received after the first type of information is received.

(2) In the above-described aspect (1), a plurality of transmission devices may be located in the network, and the first type of information and the second type of information may be transmitted by different transmission devices.

(3) In the above-described aspect (1) or (2), the first frequency may be a frequency for information to be transmitted at a lowest frequency among pieces of information to be transmitted to the network.

(4) In any one of the above-described aspects (1) to (3), an identifier indicating a type of information may be attached to the communication message.

(5) In any one of the above-described aspects (1) to (4), the identifier may indicate a transmission source of the communication message.

(6) In any one of the above-described aspects (1) to (5), the transmission device and the reception device may be mounted in a vehicle, the network may be provided in the vehicle, and the communications system may further include a control unit configured to control one or more items of traveling, stopping, turning, notification, and energy management on the basis of information included in the communication message received from the network.

(7) In any one of the above-described aspects (1) to (6), if the number of receptions exceeds a first predetermined number of times, the reception device may detect the occurrence of the abnormal state in which an illegal device impersonating the transmission device transmits a communication message to the network.

(8) In any one of the above-described aspects (1) to (7), the reception device may detect the occurrence of the abnormal state in which congestion occurs in the network if the number of receptions is less than a second predetermined number of times.

(9) In any one of the above-described aspects (1) to (8), it may be determined whether or not a reception interval of the first type of information is a predetermined time interval.

(10) In the above-described aspect (9), the determination of whether or not the reception interval of the first type of information is the predetermined time interval may be made on the basis of time information based on a signal from a satellite.

Advantageous Effects of Invention

According to an aspect of the present invention, a transmission device transmits information as a communication message to a network at a predetermined frequency determined on the basis of a type of information. A first type of information to be transmitted at a first frequency and a second type of information to be transmitted at a second frequency higher than the first frequency are transmitted as different communication messages to the network. A reception device detects the occurrence of an abnormal state in the network on the basis of the number of receptions of the second type of information until the next first type of information is received after the first type of information is received. Thereby, a communications system for more accurately detecting an abnormality in a communication state can be provided.

DESCRIPTION OF EMBODIMENTS

Hereinafter, an embodiment of a communications system of the present invention will be described with reference to the drawings.

Embodiment

Figure 1:
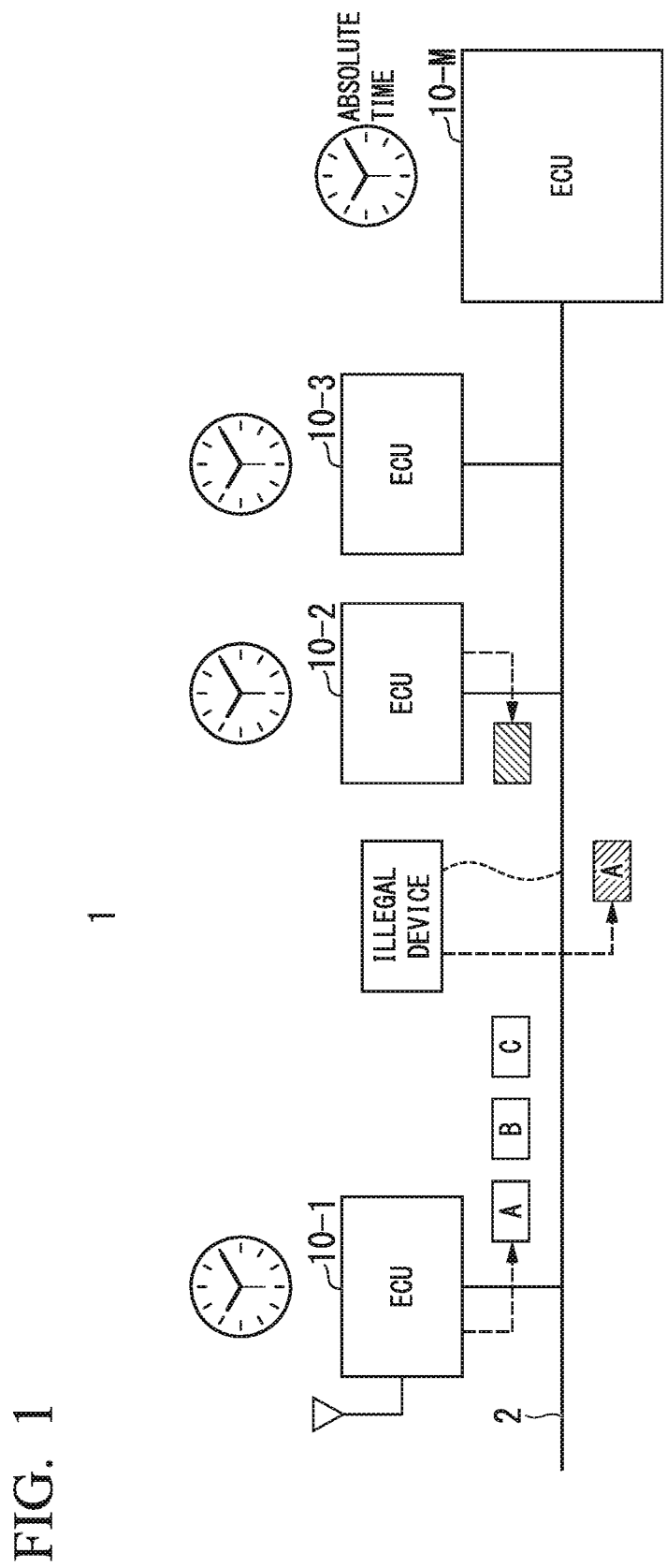
FIG. 1 is a diagram illustrating a configuration of a vehicle communications system 1 according to the present embodiment.

FIG. 1 is a diagram illustrating a configuration of a vehicle communications system 1 (a communications system) of the present embodiment.

The vehicle communications system 1 is mounted in, for example, a vehicle. The vehicle communications system 1 constitutes at least a network NW in the vehicle. In the network NW, for example, communication based on a controller area network (CAN) is performed via a bus 2.

The vehicle communications system 1 includes ECUs 10-1 to 10-3 and an ECU 10-M (a reception device) connected to the bus 2. Hereinafter, if the ECUs 10-1 to 10-3 are not distinguished from each other, they are simply referred to as an ECU 10 (a transmission device). The bus 2 delivers signals between the ECUs 10. Also, although an example in which devices such as the ECUs 10-1 to 10-3 is connected to the common bus 2 will be described, they may be connected to different buses communicably connected by a relay device (not illustrated) or the like.

For example, the ECU 10 may be an engine ECU for controlling an engine for driving the vehicle, a brake ECU for controlling a brake of the vehicle, a steering control ECU for controlling the steering of the vehicle, a display control ECU for executing a display process such as displaying of an abnormal state in the vehicle, an ECU for executing a process for adjusting an amount of energy stored in a storage battery mounted in the vehicle (energy management), a seat belt ECU for detecting a seat belt-wearing state of a passenger and notifying another ECU of a detection result or the like, but the present invention is not limited thereto. That is, one or more ECUs 10 control one or more items of traveling, stopping, turning, notification, and energy management of the vehicle independently or in cooperation.

The ECU 10 receives a frame transmitted to the network NW to which a host device belongs.

Hereinafter, each frame which is transmitted to the network NW is referred to as a frame F. The frame F is identified by an identifier (hereinafter referred to as an ID) attached thereto. The ECU 10 refers to an ID attached to the received frame F (hereinafter referred to as a reception ID), stores an ID for identifying the frame F related to a host ECU 10 (hereinafter referred to as a registered ID) from among received frames F in a storage unit 20 (FIG. 2), and extracts and acquires a frame to which the reception ID having the same value as the registered ID is attached. Also, for example, the ECU 10 transmits a frame to the bus 2 in accordance with a preset priority on a condition that the frame F including the reception ID having the same value as the registered ID of the host ECU 10 is received.

The priority is set for each frame F which is transmitted to the network NW and the ECU 10 transmits frames from the frame F with a high priority.

Figure 2:
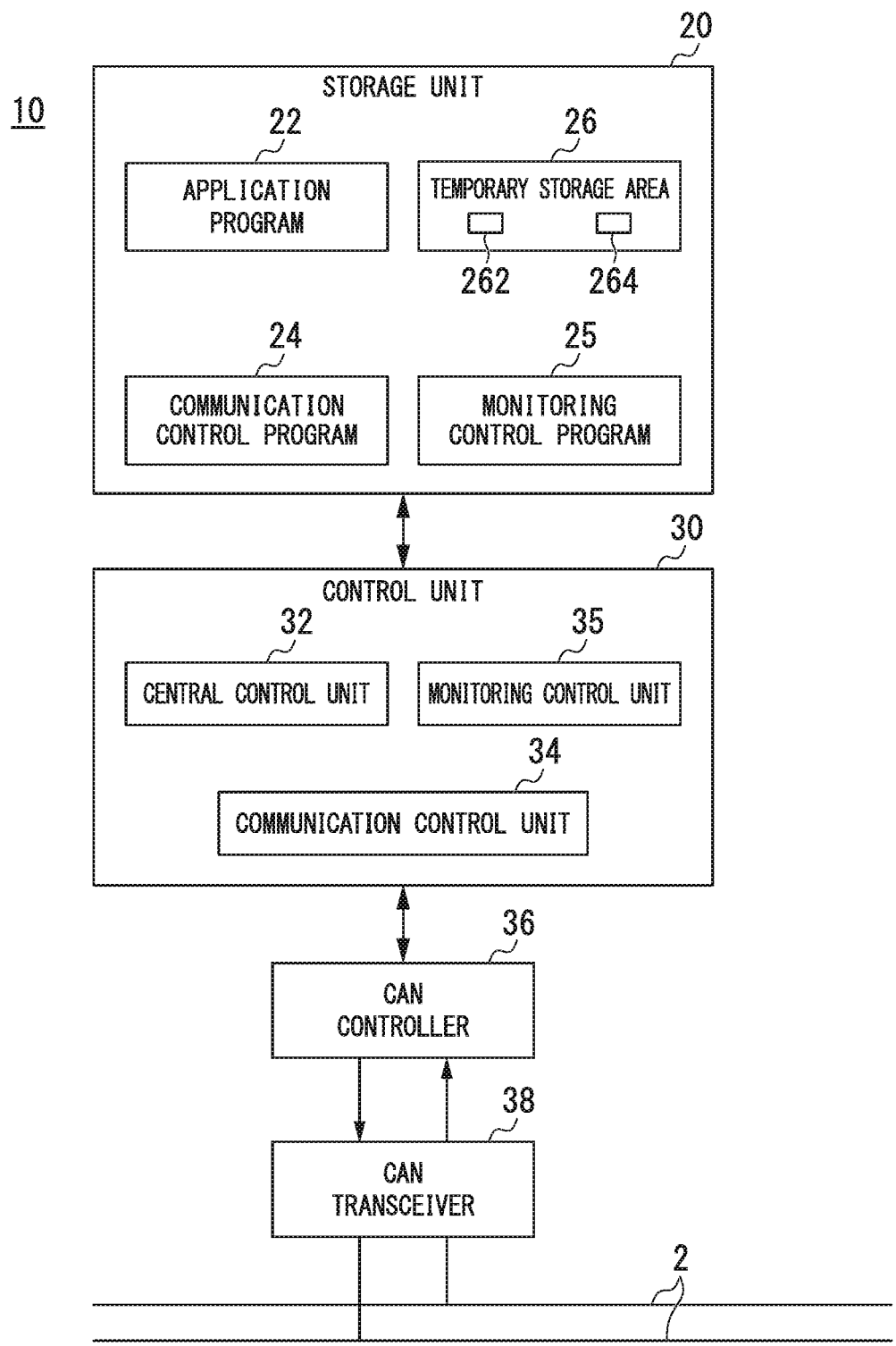
FIG. 2 is a diagram illustrating an example of a configuration of an ECU 10 according to the present embodiment.

FIG. 2 is a diagram illustrating an example of a configuration of the ECU 10. For example, the ECU 10 includes a storage unit 20, a control unit 30, a CAN controller 36, and a CAN transceiver 38. The control unit 30 includes, for example, a processor such as a central processing unit (CPU).

For example, the storage unit 20 can be implemented by a nonvolatile storage device such as a read only memory (ROM), an electrically erasable and programmable read only memory (EEPROM), or a hard disk drive (HDD) and a volatile storage device such as a random access memory (RAM) or a register. The storage unit 20 stores programs such as an application program 22 and a communication control program 24 and various types of information to be referred to by the above-described programs. The storage unit 20 has a temporary storage area 26 including a transmission buffer 262 (a message storage unit) and a reception buffer 264. In the transmission buffer 262, a message which is included in the frame F and transmitted from the ECU 10 is stored. In the reception buffer 264, a message included in the frame F received by the ECU 10 is stored. Also, for example, the storage unit 20 stores an ID table in which the ID of the frame F to be transmitted and received via the network NW is stored as various types of information. For example, the ID of the frame F includes information indicating a transmission source, a destination, a type of frame F, and the like.

More specifically, the ID table includes the ID of the frame F to be individually received by each of the ECUs 10 and the ID of the frame F to be individually transmitted by each of the ECUs 10. Also, a transmission schedule of the frame F to be transmitted to the network NW and priority information which is information indicating the priority of the frame F are stored in the storage unit 20.

The application program 22 is a program for performing information processing assigned to each ECU 10. For example, the application program 22 may include a program for controlling various types of functional units provided in the vehicle, a program for relaying communication via the network NW, a program for controlling communication of the network NW, and the like.

The communication control program 24 is a program for causing a communication process to be executed by controlling the CAN controller 36 in response to a request from the application program 22 or a monitoring control program 25 and acquiring a result of the communication process related to communication via the CAN controller 36 as management information. The communication control program 24 may be configured to include a control program to be executed by the CAN controller 36 itself or may be configured without including a control program to be executed by the CAN controller 36 itself when the CAN controller 36 has a control program to be executed by the CAN controller 36 itself. In the following description, a case in which the communication control program 24 includes the control program of the CAN controller 36 will be exemplified.

The monitoring control program 25 is a program for managing the communication state and includes a program for a communication failure detection process. Details of the communication failure detection process will be described below. The monitoring control program 25 may be provided in the ECU 10 configured to perform the communication failure detection process.

The control unit 30 includes a central control unit 32, a communication control unit 34, and a monitoring control unit 35. The central control unit 32 functions by executing the application program 22 and executes the control given to the ECU 10. When a message or the like is transmitted from the ECU 10, the central control unit 32 stores information including the message to be transmitted and the like in the transmission buffer 262 of the temporary storage area 26 and notifies the communication control unit 34 of a transmission request. If a message or the like is received from another ECU 10 or the like, the central control unit 32 receives a notification indicating that the message or the like has been received from the communication control unit 34, and acquires the information stored in the transmission buffer 262 of the temporary storage area 26.

The communication control unit 34 functions by executing the communication control program 24, and executes a communication process of the ECU 10 under control of the central control unit 32. The communication control unit 34 refers to the reception ID of the frame F received via the CAN transceiver 38 and the registered ID stored in the ID table, and determines whether or not the received frame F is a frame F including information to be used by the central control unit 32 of the host device. The communication control unit 34 uses the reception ID registered in the ID table, for example, when the above-described determination is made.

If information to be used by the host ECU 10 is included in the frame F, the communication control unit 34 acquires the information (a message or the like) included in the frame F and stores the acquired information in the reception buffer 264 of the temporary storage area 26 of the storage unit 20. On the other hand, for example, if the information to be used by the own ECU 10 is not included in the frame F, the communication control unit 34 performs control for discarding the information included in the frame F.

The communication control unit 34 causes the CAN controller 36 to transmit the frame F from the CAN transceiver 38. For example, the communication control unit 34 transmits a frame F (a request frame) to which an ID indicating that the host device transmits the frame F is attached to the bus 2 and includes a message stored in the transmission buffer 262 of the temporary storage area 26 in a frame F (a response frame) to which an ID indicating that the host device transmits the frame F is attached and transmits the frame F (the response frame) to the bus 2 if a transmitted request frame is received. Also, the communication control unit 34 causes the transmission buffer 262 to store the frame F to which the priority is assigned and deletes the frame stored in the transmission buffer 262 in accordance with the transmission of the frame F.

The monitoring control unit 35 functions by executing the monitoring control program 25. The monitoring control unit 35 executes the communication failure detection process of monitoring the communication state in the ECU 10 every time the frame F is received and manages a situation in which a communication failure occurs in the network NW. Also, the monitoring control unit 35 may be provided in the ECU 10 configured to execute the communication failure detection process and may be configured to perform a process similar to that of a monitoring control unit 35M to be described below.

The CAN controller 36 transmits and receives various frames F to and from the bus 2 via the CAN transceiver 38. Also, when the frame F is received from the CAN transceiver 38, the CAN controller 36 extracts the frame F from the received signal supplied from the CAN transceiver 38 and stores the extracted frame F in the reception buffer 264 of the temporary storage area 26.

The CAN transceiver 38 functions as a transmission unit configured to transmit the frame F to the bus 2 or a receiving unit configured to receive the frame F from the bus 2.

Figure 3:
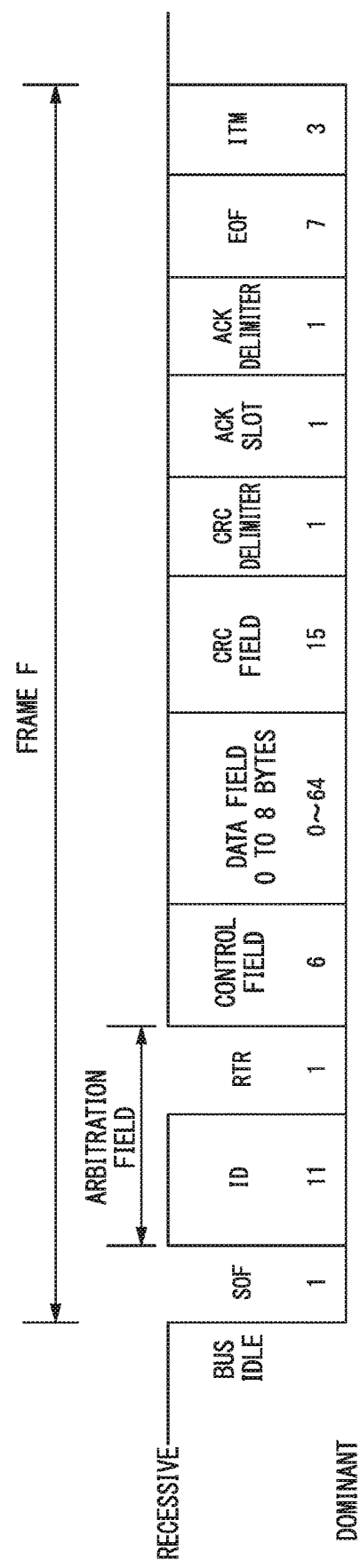
FIG. 3 is an example of a format of a frame F transmitted to a bus 2 by the ECU 10 of the present embodiment.

FIG. 3 illustrates an example of a format of a frame F transmitted by the ECU 10 to the bus 2. In FIG. 3(a), a frame F to be transmitted in one transmission is illustrated. The frame F includes a start of frame (SOF) indicating the start of the frame F, an arbitration field including an ID of the frame F and a remote transmission request (RTR) for identifying the frame F and a remote frame, a control field indicating the number of bytes of the frame F, and the like, a data field which is the substance of the frame F to be transferred, a CRC field for adding an error detection code (CRC) for detecting an error of the frame F, and an ACK slot and an ACK delimiter for receiving a notification (ACK) from a unit receiving the correct frame F, an end of frame (EOF) indicating the end of the frame F, and the like. The ECU 10 assigns user data to a predetermined position within the data field of the frame F and performs communication.

Figure 4:
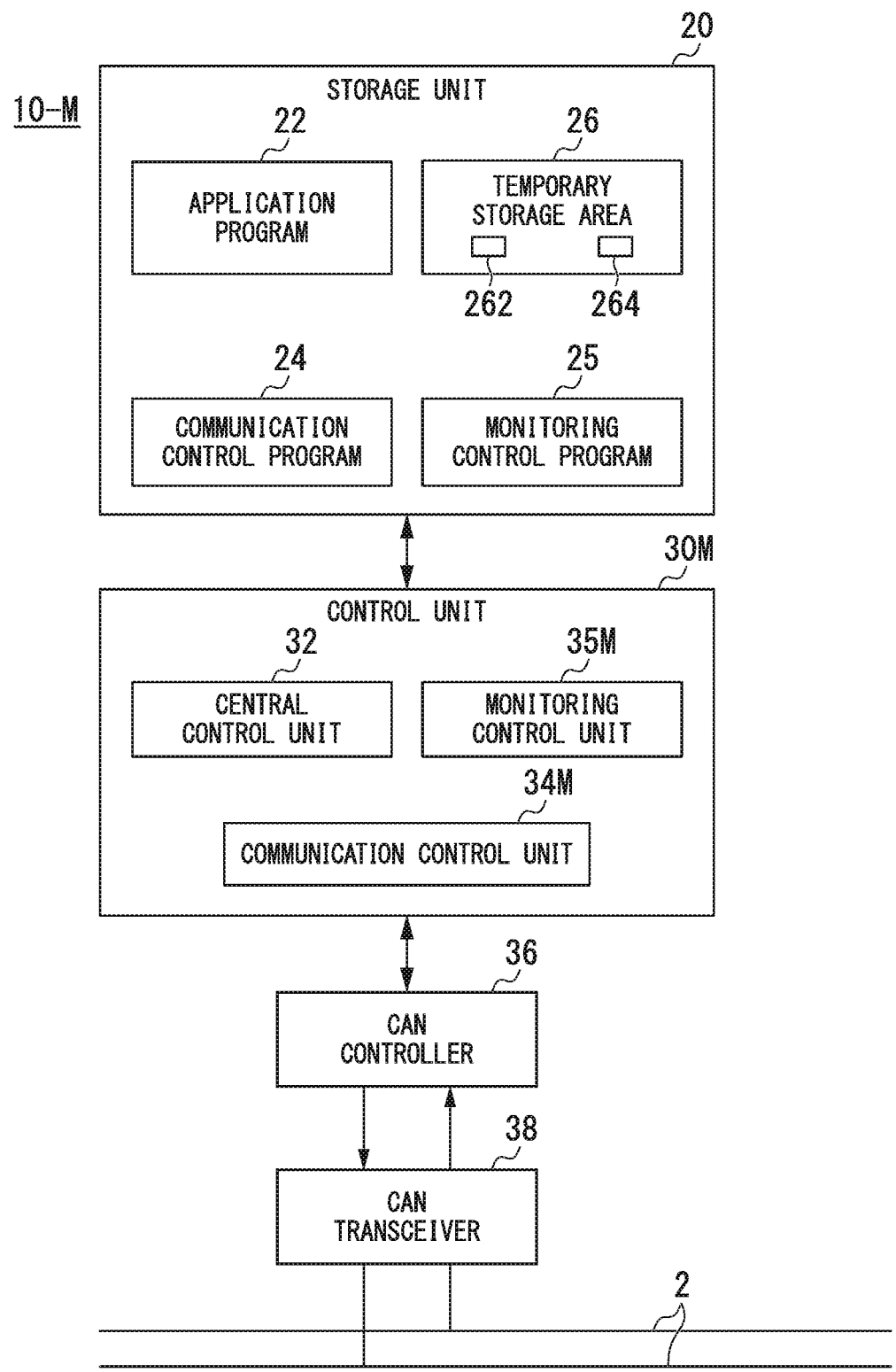
FIG. 4 is a diagram illustrating an example of a configuration of an ECU 10-M according to the present embodiment.

FIG. 4 is a diagram illustrating an example of a configuration of the ECU 10-M of the present embodiment. The ECU 10-M is partly different from the configuration of the above-described ECU 10. The difference will be described. The ECU 10-M includes a control unit 30M in place of the control unit 30. The control unit 30M includes a central control unit 32, a communication control unit 34M, and a monitoring control unit 35M.

In addition to the process of the communication control unit 34, the communication control unit 34M performs the following process. An ID for identifying the ECU 10 to be monitored is registered in the ID table referred to by the communication control unit 34M and a frame addressed to the ECU 10 to be monitored is received.

In addition to the process of the monitoring control unit 35, the monitoring control unit 35M performs the following process. On the basis of the type of received frame F, the monitoring control unit 35M counts the number of received frames for each type of frame F and manages a counting result as a value of a reception counter. The monitoring control unit 35M uses an ID registered in advance in the ID table as a reference for identifying the type of frame F.

Every time the frame F is received, the monitoring control unit 35M executes the communication failure detection process of periodically monitoring the communication state in the network NW and the communication state in the ECU 10 to manage a situation in which a communication failure occurs in the network NW. Details of the communication failure detection process of the monitoring control unit 35M will be described below.

(Overview of Communication Abnormality Detection Process)

The communication abnormality detection process in the vehicle communications system 1 will be described with reference to FIG. 1 again.

The ECU 10-1 transmits a communication message including control information having different properties for each item of control. For example, in the ECU 10-1, each frame of a frame A, a frame B, and a frame C corresponds to a communication message including the control information having different properties. The frame A has a shorter transmission cycle than the frame B and the frame C and corresponds to a control item required to indicate a control state in a shorter period. On the other hand, the frame C has a longer transmission cycle than the frame A and the frame B and corresponds to a control item capable of satisfying a purpose of control even if the control state is indicated in a longer cycle.

The ECU 10-M executes a communication abnormality detection process of monitoring the frame F including information having different properties. For example, the ECU 10-M detects a communication abnormality in the vehicle communications system 1 on the basis of the number of incoming frames F.

Figure 5:
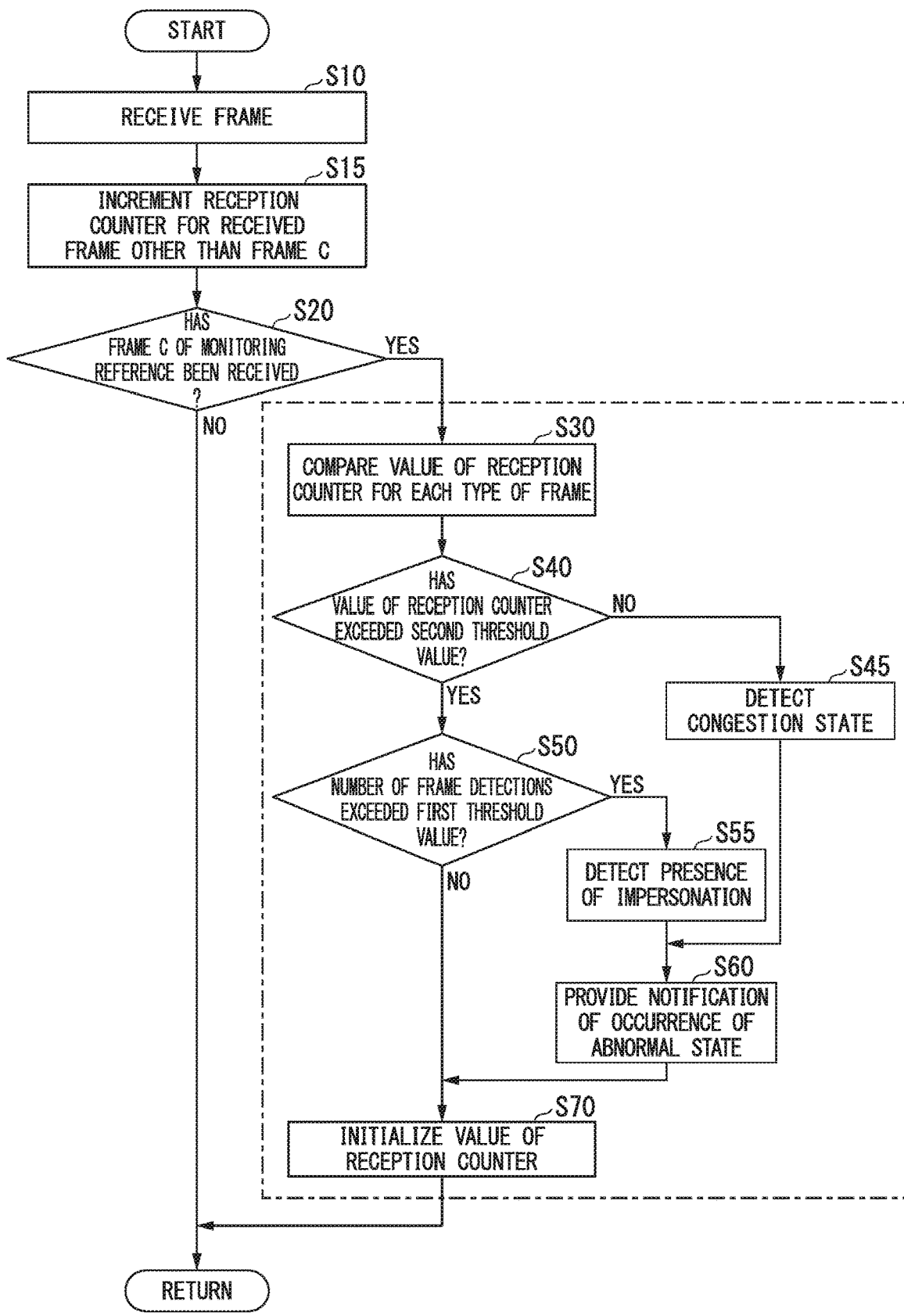
FIG. 5 is a flowchart illustrating an example of a process in the ECU 10-M according to the present embodiment.

FIG. 5 is a flowchart illustrating a procedure of the communication abnormality detection process of the ECU 10-M.

The communication control unit 34M of the ECU 10-M receives a frame from the bus 2 (S10) and classifies the received frame according to the type of frame. The monitoring control unit 35M increments the value of the reception counter for each type of received frame other than the frame C (S15).

Next, the monitoring control unit 35M determines whether or not a frame C used as a monitoring reference is included in the received frame (S20). If the frame C is not included in the received frame, the process illustrated in FIG. 5 ends and waits for the next frame to be detected.

On the other hand, if the received frame includes the frame C, the monitoring control unit 35M performs the following process for each type of frame. The monitoring control unit 35M compares a value of the reception counter obtained as a result of calculation in S15 with a second threshold value determined for each type of frame (S30), and determines whether or not the value of the reception counter for each type described above has exceeded the second threshold value (the second predetermined number of times) (S40).

Next, if the value of the reception counter is less than or equal to the second threshold value, the monitoring control unit 35M detects the occurrence of a congestion state (S45) and performs the processing of S60.

On the other hand, if the value of the reception counter has exceeded the second threshold value, the monitoring control unit 35M determines whether or not the value of the reception counter has exceeded the first threshold value (S50). If the value of the reception counter has exceeded the first threshold value, the monitoring control unit 35M determines that there is a device that impersonates a transmission source of the frame and transmits a frame misrepresenting the transmission source (a fraudulent frame) (S55).

Next, after the processing of S45 or S55 is completed, the monitoring control unit 35M transmits a frame for providing a notification of the occurrence of an abnormal state to the bus 2 and causes the display unit to display the occurrence of the abnormal state (S60).

Next, after the processing of S50 or S60 is completed, the monitoring control unit 35M initializes the value of the reception counter (S70) and completes a determination process of a determination cycle.

Figure 6:
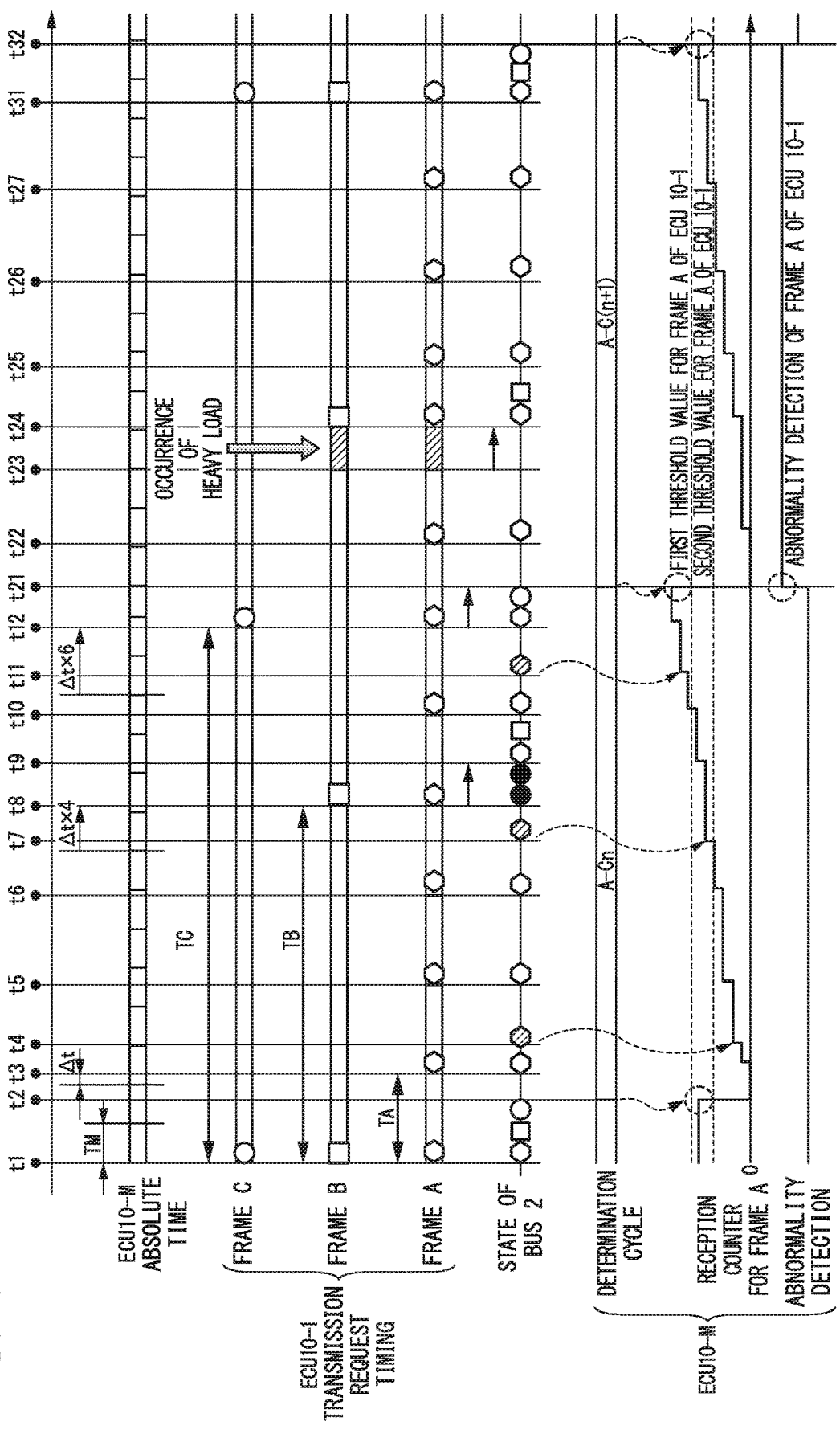
FIG. 6 is an explanatory diagram illustrating an operation of an abnormality detection process of the ECU 10-M according to the present embodiment.

An operation of the abnormality detection process by communication between the ECU 10-1 and the ECU 10-M will be described with reference to FIG. 6. FIG. 6 is an explanatory diagram illustrating an operation of the abnormality detection process of the ECU 10-M. In FIG. 6, a timing chart illustrating an example of the operation of the abnormality detection process of the ECU 10-M is illustrated. In this timing chart, an $n^{th}$ abnormality detection process in which a period from time t2 to time t21 is set as a determination cycle (A–Cn) and an $(n+1)^{th}$ abnormality detection process in which a period from time t21 to time t32 is set as a determination cycle (A–C(n+1)) will be described.

The number of determination cycles and a length of a cycle are not limited to the number of times and the length which are illustrated.

An absolute time of the ECU 10-M, a transmission request timing of the ECU 10-1, a state of the bus 2, and a state of the ECU 10-M are illustrated in order from the upper part of FIG. 6.

The absolute time of the ECU 10-M indicates a time in the ECU 10-M generated on the basis of a unit time TM. In the ECU 10-M, each process is performed on the basis of the absolute time.

A reference timing for executing the transmission of each frame of the frame C, the frame B, and the frame A is indicated at the transmission request timing of the ECU 10-1, and a time thereof is set as the transmission request timing. For example, the transmission of the frame C is requested at the timing of a ○ mark, and a cycle thereof is set as TC. The transmission of the frame B is requested at the timing of a □ mark, and a cycle thereof is set as TB. The transmission of the frame A is requested at the timing of a hexagon mark and a cycle thereof is set as TA. Although the transmission of each frame at the transmission request timing is set as a reference, the timing at which the frame is transmitted to the bus 2 may be delayed due to a cause such as an overload state in a processing situation of the control unit in the ECU 10-1, or a communication state in which the bus 2 is being used by another ECU 10 or the like. Details thereof will be described below with specific examples.

As the state of the ECU 10-M, a determination cycle, a value of the reception counter indicating a result of counting the number of received frames A, and a result of detecting an abnormality based on a value indicated by the reception counter are shown.

Meanwhile, reference clocks of the ECU 10 and the ECU 10-M are asynchronous. The ECU 10 and the ECU 10-M execute various types of processes on the basis of absolute times on the basis of the clocks provided in the ECU 10 and the ECU 10-M. In such a vehicle communications system 1, a difference in a frequency of the clock of each ECU 10 is present and therefore an error occurs in the absolute time of each ECU 10.

For example, a relationship between a reference unit time TM of the absolute time of the ECU 10-M and the transmission cycle TA of the frame A of the ECU 10-1 is assumed to be a relationship of 1:2. However, because the absolute time of the ECU 10-M and the absolute time of the ECU 10-1 are asynchronous, the relationship between the unit time TM and the transmission cycle TA does not match the above-described ratio. In the example illustrated in FIG. 6, a relationship (unit time TM×2<transmission cycle TA) is given and an actual transmission time is relatively delayed in accordance with the lapse of time. For example, when a time at which a time of unit time TM×2 has elapsed from time t1 is compared with time t3, an error time Δt occurs. That is, every time the frame A is transmitted, the error time Δt between the absolute time of the ECU 10-1 and the absolute time of the ECU 10-M is totaled.

For example, a ratio of TA:TB:TC of the transmission cycles of the frame A, the frame B, and the frame C in the ECU 10-1 illustrated in FIG. 6 is defined as a ratio of 1:4:6. The frame A, the frame B, and the frame C are examples of the frame F. In this case, the ECU 10-1 transmits the frame A six times during one transmission cycle TC of the frame C. Also, there is an error time (Δt×4) between a time at which a time of unit time TM×8 has elapsed from time t1 and time t8 when they are compared. That is, every time the frame B is transmitted, the error time (Δt×4) between the absolute time of the ECU 10-1 and the absolute time of the ECU 10-M is totaled. Also, there is an error time (Δt×6) between a time at which a time of unit time TM×12 has elapsed from time t1 and time t12 when they are compared. That is, every time the frame C is transmitted, the error time (Δt×6) between the absolute time of the ECU 10-1 and the absolute time of the ECU 10-M is totaled. In this manner, although the error time between the absolute time of the ECU 10-1 and the absolute time of the ECU 10-M is accumulated, a reception interval of the frame received by the ECU 10-M is not affected by the accumulated error time described above. The ECU 10-M executes an abnormality detection process using a timing at which the frame C having the longest cycle among the above-described frames is received as a reference.

Hereinafter, an example of the abnormality detection process will be described with the lapse of time.

At time t1 illustrated in FIG. 6, the ECU 10-1 transmits three frames of the frame A, the frame B, and the frame C. In the three frames of the frame A, the frame B, and the frame C, an order of transmission is determined in accordance with a predetermined priority. For example, the ECU 10-1 performs transmission in the order of the frame A, the frame B, and the frame C in accordance with the order of priority. According to control of this priority, a timing at which the transmission of the frame C is completed is delayed until time t2.

Here, the ECU 10-M receives the frame A, the frame B and the frame C and initializes the reception counters of the frame A and the frame B to 0 after a process of determining the frame A and the frame B is performed. Details of the determination process will be described below.

When the transmission cycle TA elapses from time t1 and time t3 is reached, the ECU 10-1 transmits the next frame A. The ECU 10-M receives the frame A and increments the reception counter to 1.

A false frame A is transmitted to the bus 2 at time t4 before time t5 at which the transmission cycle TA has elapsed from time t3 and the ECU 10-M receives the false frame A and increments the reception counter for the frame A. In this step, the ECU 10-M cannot distinguish a false frame A and a legitimate frame A and the false frame A and the legitimate frame A are erroneously detected, but the reception counter is incremented as described above. As a result, the value of the reception counter for the frame A is set to 2.

At times t5 and t6, the ECU 10-1 transmits frames A. The ECU 10-M receives the frames A and increments the reception counter for the frames A in order.

The false frame A is retransmitted to the bus 2 at time t7 before time t8 at which the transmission cycle TA has elapsed from time t6 and the ECU 10-M receives the false frame A and increments the reception counter for the frame A. At this time, the value of the reception counter for the frame A is set to 5. Also, according to the above-described increment, the value of the reception counter for the frame A exceeds the second threshold value for the frame A.

Time t8 is a timing at which the ECU 10-1 transmits the frame A and the frame B (a transmission request timing). However, at time t8, the bus 2 is occupied by other communication and no transmission is performed at the transmission request timing. A ● mark shown after time t8 indicates a frame transmitted in preference to the frame A and the frame B. The ECU 10-1 transmits the frame A and the frame B in the order of priority after the occupation of the bus 2 is released (time t9). The ECU 10-M receives the frame A and the frame B and individually increments reception counters for the frame A and the frame B.

At time t10 when the transmission cycle TA has elapsed from time t8, the ECU 10-1 transmits the frame A. The ECU 10-M receives the frame A and increments the reception counter for the frame A. Also, according to the above-described increment, the value of the reception counter for the frame A exceeds the first threshold value for the frame A.

The false frame A is retransmitted to the bus 2 at time t11 before time t12 at which the transmission cycle TA has elapsed from time t10 and the ECU 10-M receives the false frame A and increments the reception counter for the frame A.

Time t12 is a timing at which the frame A and the frame C are transmitted (a transmission request timing). The ECU 10-1 sequentially transmits the frame A and the frame C. The ECU 10-M receives the frame A and increments the reception counter for the frame A. Furthermore, at time t21, the ECU 10-M executes a determination process for each type of frame by detecting the frame C. The value of the reception counter for the frame A shown in FIG. 6 is 9.

Because the value of the reception counter for the frame A is 9 exceeding the first threshold value, the ECU 10-M detects the presence of impersonation according to a determination result based on the value of the reception counter for the frame A.

Likewise, the ECU 10-M also makes a determination on the frame B on the basis of the value of the reception counter. Because a false frame B is not received for the frame B, the value of the reception counter for the frame B becomes a value between the first threshold value and the second threshold value for the frame B. For example, it is assumed that 0 and 2 are preset for the first threshold value and the second threshold value for the frame B, respectively.

Because the value of the reception counter for the frame B is 1 in the case of the result illustrated in FIG. 6, the ECU 10-M determines that the value of the reception counter for the frame B is a value between the first threshold value and the second threshold value for the frame B and determines that there has been no abnormality in reception of the frame B.

Likewise, the ECU 10-M iterates the process of the next determination cycle from time t21. In the next determination cycle, there is no occurrence of the false frame A, and the ECU 10-M sequentially detects the frame A.

At time t31, as at time t1, the ECU 10-1 transmits three frames of the frame A, the frame B, and the frame C. The ECU 10-M receives the frame A, the frame B, and the frame C, increments the reception counters for the frame A and the frame B, and performs each determination process.

Because neither the false frame A nor the false frame B has been received by the ECU 10-M in this determination cycle, the values of the reception counters for the frame A and the frame B become values between the first threshold value and the second threshold value. The ECU 10-M determines that there has been no abnormality in reception of the frame A and the frame B.

Also, a situation in which the transmissions of the frame A and the frame B at the transmission request timing of time t23 of the determination period are delayed until time t24 is shown. In the case of time t23, the bus 2 is not occupied unlike the case of time t8 described above. At time t23, a cause of an increase in a processing load inside the ECU 10-1 occurs and the ECU 10-1 causes the transmissions of the frame A and the frame B to be delayed as a result of prioritizing a process thereof.

As described above, fluctuation occurs in the transmission timing of the frame to be transmitted to the bus 2 according to a situation of the bus 2, a load situation of a process within the ECU 10-1 of a transmission side, and the like. Even when fluctuation occurs as described above, the ECU 10-M can accurately determine a frame transmission situation.

According to the above-described embodiment, a first type of information to be transmitted at a first frequency and a second type of information to be transmitted at a second frequency higher than the first frequency are transmitted as different frames F to the network NW. The ECU 10-M detects the occurrence of an abnormal state in the network NW on the basis of the number of receptions in which the second type of information classified as the frame A has been received until the next first type of information is received after the first type of information is received. Thereby, the vehicle communications system 1 can more accurately detect an abnormality in the communication state.

Also, in the above-described vehicle communications system 1, there are a plurality of ECUs 10 in the network NW. The first type of information and the second type of information are transmitted by different ECUs 10. The plurality of ECUs 10 include the ECU 10 configured to transmit the first type of information and the ECU 10 configured to transmit the second type of information, so that the vehicle communications system 1 can detect an abnormality in the communication state on the basis of the first type of information and the second type of information.

Also, in the above-described vehicle communications system 1, the first frequency is a frequency for information to be transmitted to the network at a lowest frequency among pieces of information to be transmitted in the frame F. In the above-described case, the first frequency is a frequency at which information is transmitted in the frame C. Thereby, the vehicle communications system 1 can detect an abnormality in the communication state according to a simple process in which the number of received frames F is counted on the basis of a timing at which the information transmitted at a lowest frequency has been received. Also, a case in which a frequency for information to be transmitted at a lowest frequency is set as the first frequency and an abnormality occurring in the network NW according to the present embodiment is detected has been described in the above-described embodiment. In the present embodiment, the setting of the first frequency to a lowest frequency is optional and a frequency of a frame to be transmitted at a frequency lower than a frequency assigned to frames of which the number of receptions is counted (the second frequency) may be set as the first frequency. In the above-described configuration, it is also possible to perform abnormality detection similar to that of the above-described embodiment. That is, similar abnormality detection is enabled even when the frequency of the frame B is set as the first frequency and the number of receptions is counted until the next frame B is received with respect to the frame A which is transmitted at the second frequency which is a frequency higher than the first frequency.

Also, in the above-described vehicle communications system 1, an ID indicating a transmission source of the frame F is attached to the frame F, so that the ECU 10-M can identify the transmission source of the frame F from the reception ID of the received frame F and classify the received frame F by adding the transmission source to a condition in addition to the type of information. Thereby, even when there are a plurality of ECUs 10 configured to transmit frames F of the same type, it is possible to classify the frames F and more accurately detect an abnormality in a communication state.

Also, in the above-described vehicle communications system 1, the ECU 10-M detects the occurrence of an abnormal state in which an illegal device impersonating the ECU 10 transmits a frame to the network NW if the number of receptions exceeds the predetermined number of times determined by the first threshold value. That is, if the ECU 10-M performs receptions more than the predetermined number of times determined by the first threshold value determined on the basis of a desired value, the ECU 10-M can detect a situation in which frames other than the frame F to be detected are transmitted to the network NW and detect such a situation as the presence of impersonation.

Also, in the vehicle communications system 1, the ECU 10-M detects the occurrence of an abnormal state in which congestion occurs in the network NW if the number of receptions is less than the predetermined number of times determined by the second threshold value. That is, when reception has been performed only a few times less in number than the predetermined number of times determined by the second threshold value determined on the basis of the desired value, the ECU 10-M can detect the occurrence of a situation in which the frame F to be detected cannot be transmitted to the network NW and can detect the congestion of the network NW from a result of such detection.

First Modified Example of Embodiment

Hereinafter, a first modified example of the embodiment will be described. As illustrated in FIG. 1, the ECU 10-1, the ECU 10-2, and the ECU 10-M are installed in a vehicle, and the network NW is provided in the vehicle. Although a case in which the ECU 10-M implements the abnormality detection process is exemplified in the above-described embodiment, the present invention is not limited thereto. For example, the ECU 10-2 includes a control unit 30 configured to control one or more items of traveling, stopping, turning, notification, and energy management of the vehicle on the basis of information included in a frame (a communication message) received from the network NW and the control unit 30 may be configured to further perform an abnormality detection process.

According to a vehicle communications system 1 of the first modified example, each ECU 10 can perform the abnormality detection process without individually providing the ECU 10-M by configuring the ECU 10-2 as described above.

Second Modified Example of Embodiment

Figure 7:
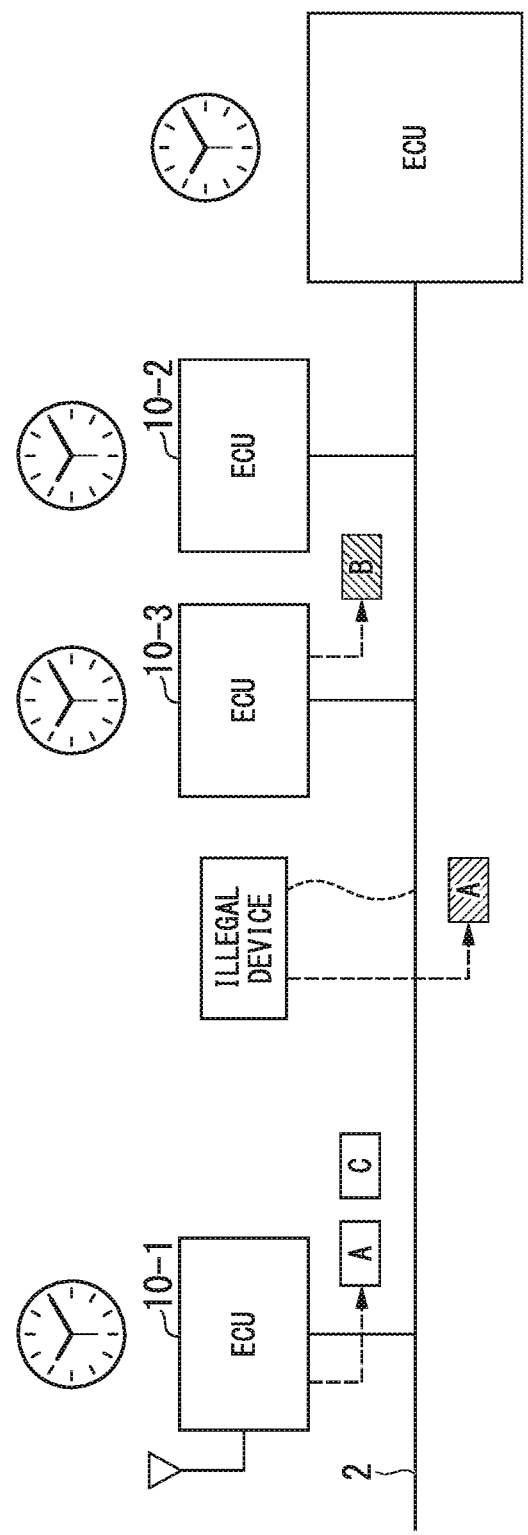
FIG. 7 is a diagram illustrating a second modified example of the present embodiment.

Hereinafter, a second modified example of the embodiment will be described. Although the example in which the ECU 10-1 transmits all the frames A, B, C has been described in the above-described embodiment, a case in which there are a plurality of ECUs 10 for transmitting information in accordance with a preset frequency in a network NW in place thereof in the second modified example is exemplified. For example, as illustrated in FIG. 7, a case in which an ECU 10-1 transmits a frame A and a frame C, an ECU 10-3 transmits a frame B, and an ECU 10-M and an ECU 10-2 receive the frames corresponds to a case in which a plurality of transmission devices for transmitting information in accordance with a preset frequency are located in a network.

According to a vehicle communications system 1 of the second modified example, in addition to effects similar to those of the vehicle communications system 1 of the embodiment, even in the above-described case, the ECU 10-M and the ECU 10-2 can perform a similar abnormality detection process as described above.

Third Modified Example of Embodiment

Hereinafter, a third modified example of the embodiment will be described. A vehicle communications system 1 of the modified example is different from the above-described vehicle communications system 1 in terms of a condition for detecting the occurrence of an abnormal state. This difference will be described below.

An ECU 10-M receives frames F including at least a frame A and a frame C as types from a network NW. For example, the ECU 10-M detects the occurrence of an abnormal state in the network NW on the basis of the number of receptions in which the frame A including a second type of information is received until the next frame C including a first type of information is received after the frame C including the first type of information is received.

According to the vehicle communications system 1 of the third modified example, in addition to effects similar to those of the vehicle communications system 1 of the embodiment, the following effects are exhibited. For example, the ECU 10-M may count the number of receptions on the basis of an identifier assigned to the received frame F.

Thereby, the ECU 10-M can classify a frame F by using an identifier assigned to a received frame F as a key and count the number of receptions without analyzing the details of the information.

From the above-described point of view, the vehicle communications systems 1 according to the present embodiment and the modified examples thereof can more accurately detect an abnormality in a communication state.

Although the modes for carrying out the present invention have been described above using embodiments, the present invention is not limited to the embodiments at all and various modifications and substitutions may be made without departing from the spirit and scope of the present invention.

For example, although an example of the communications system based on the CAN scheme has been described in the above-described embodiment, it is possible to perform abnormality detection according to the present invention in a communications system based on another communication scheme in place thereof.

Also, it is possible to determine whether or not a period from the reception of the first type of information to the reception of the next first type of information (an interval at which the first type of information is received) is a predetermined time interval. The determination of whether or not the interval is the predetermined time interval can be made on the basis of time information on which timer correction has been performed on the basis of a signal from a satellite. Thereby, it is possible to detect an abnormality in a communication state with higher reliability under accurate time information.

REFERENCE SIGNS LIST

1 Vehicle communications system (communications system)
2 Bus
10 ECU
10-1 ECU (transmission device)
10-2 ECU (reception device)
10-3 ECU
10-M ECU (reception device)
20 Storage unit
30, 30M Control unit
36 CAN controller
38 CAN transceiver
50 Node
NW Network The invention claim is:

1. A communications system comprising a transmission device configured to transmit information as a communication message to a network at a predetermined transmission cycle according to a type of information and a reception device configured to receive the communication message,
   wherein the transmission device transmits a first type of information attached with a first identifier that indicates the first type of information at a first transmission cycle and a second type of information attached with a second identifier that indicates the second type of information at a second transmission cycle shorter than the first transmission cycle as different communication messages to the network,
   wherein the first transmission cycle is a transmission cycle for information to be transmitted at a lowest transmission cycle among pieces of information to be transmitted to the network,
   wherein the reception device detects occurrence of an abnormal state in the network on a basis of a number of receptions of the second type of information attached with the second identifier indicating the second type of information in a reception interval between the first type of information received by the reception device and a next first type of information received by the reception device, and
   wherein, if the number of receptions exceeds a first predetermined number of times, the reception device detects the occurrence of the abnormal state in which an illegal device impersonating the transmission device transmits the communication message to the network.

2. The communications system according to claim 1, wherein it is determined whether or not the reception interval of between the first type of information and the next first type of information is a predetermined time interval.

3. The communications system according to claim 2, wherein the determination of whether or not the reception interval between the first type of information and the next first type of information is the predetermined time interval is made on a basis of time information based on a signal from a satellite.

4. The communications system according to claim 1, wherein a plurality of transmission devices are located in the network, wherein the first type of information and the next first type of information are transmitted by one of the plurality of transmission devices, and wherein the second type of information is transmitted by another of the plurality of transmission devices.

5. The communications system according to claim 1, wherein the first identifier and the second identifier indicate a transmission source of the communication message.

6. The communications system according to claim 1,
wherein the transmission device and the reception device are mounted in a vehicle, wherein the network is provided in the vehicle, and wherein the communications system further includes a control unit configured to control one or more items of traveling, stopping, turning, notification, and energy management on a basis of information included in the communication message received from the network.

7. The communications system according to claim 1, wherein the reception device detects the occurrence of the abnormal state in which congestion occurs in the network if the number of receptions is less than a second predetermined number of times.

\* \* \* \* \*